Figure 3:
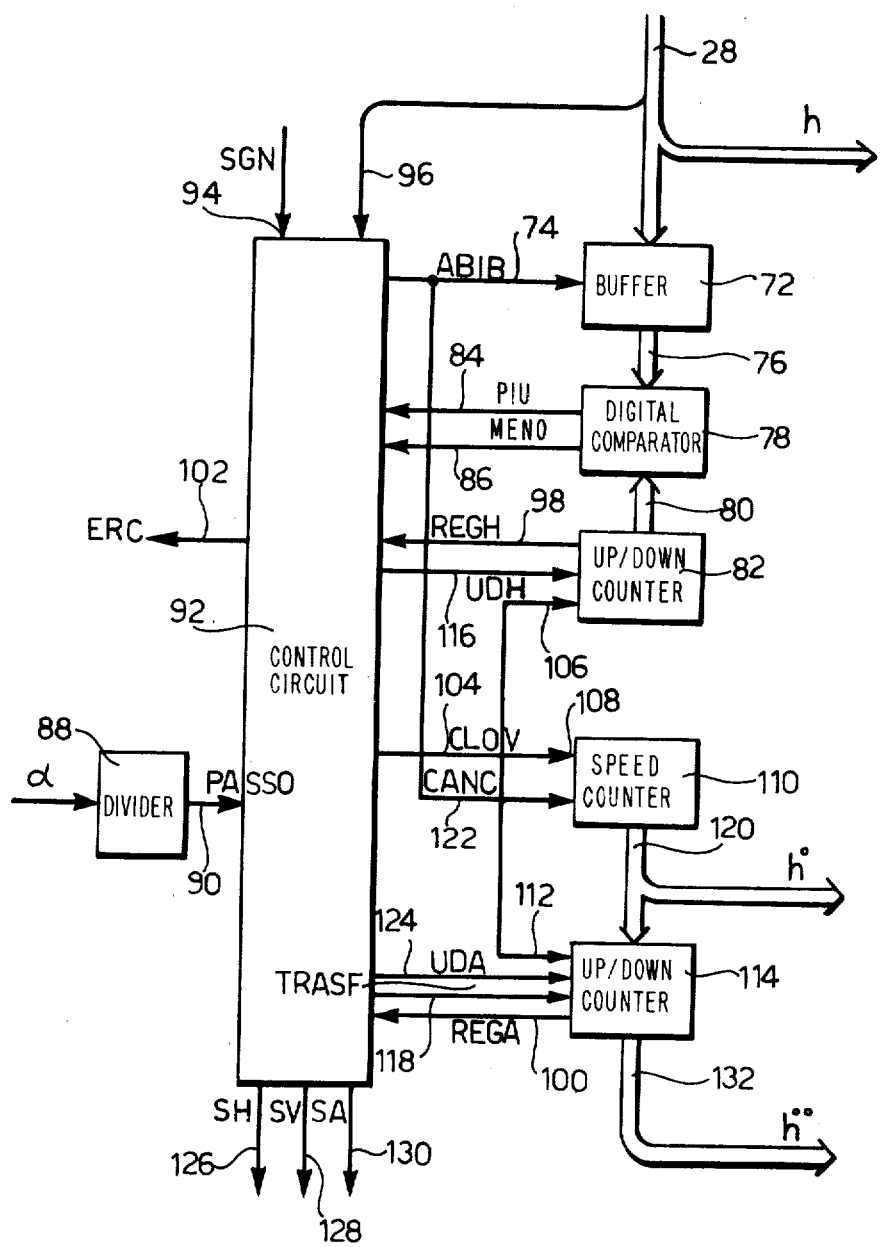

United States Patent
Bencini et al.

[11] 3,899,664
[45] Aug. 12, 1975

[54] APPARATUS FOR DETERMINING THE COURSE OF STROKE, SPEED, AND ACCELERATION ON A CAM PROFILE

[75] Inventors: Mario Bencini; Massimo Fantacchiotti, both of Turin, Italy

[73] Assignee: Consiglio Nazionale Delle Ricerche, Rome, Italy

[22] Filed: Feb. 21, 1974

[21] Appl. No.: 444,423

[30] Foreign Application Priority Data
Feb. 23, 1973  Italy .................................. 67471/73

[52] U.S. Cl. ............ 235/151.32; 33/174 L; 73/489; 235/92 MP; 235/151.3
[51] Int. Cl. .......................... G06f 15/20; G06g 7/78
[58] Field of Search ....... 235/151.32, 151.3, 92 MP, 235/92 MT; 73/488, 489, 503; 324/160, 162; 340/347 SY, 347 DA; 33/174 L, 174 P

[56] References Cited
UNITED STATES PATENTS

| | | |
|---|---|---|
| 3,234,655 | 2/1966 | Skeels et al. ...................... 33/174 L |
| 3,532,863 | 10/1970 | Enslein et al. ................... 235/151.3 |
| 3,731,386 | 5/1973 | Kreiensen et al. ................ 33/174 L |
| 3,755,907 | 9/1973 | Kreiensen et al. ................ 33/174 L |

OTHER PUBLICATIONS

Oppen, H.; A New Cam Profile Measuring Machine; Siemens Review XXXVII (1970) No. 12; pp. 653–655.

Primary Examiner—Malcolm A. Morrison
Assistant Examiner—Errol A. Krass
Attorney, Agent, or Firm—Sughrue, Rothwell, Mion, Zinn and Macpeak

[57] ABSTRACT

The stroke, speed and acceleration of a cam profile can be represented graphically or by analogous or digital signals by utilizing a displacement sensor which cooperates with the cam profile and an angular displacement sensor which cooperates with the cam. The displacement sensor provides a pulse train which is processed to furnish digital signals of the stroke, speed and acceleration of the cam which are variable in time and the angular movement sensor provides a digital signal of angular displacement of the cam on rotation of the cam. The digital signals are then converted into analogous form by a conversion and synchronization circuit which can then be applied to an X-Y recorder.

4 Claims, 4 Drawing Figures

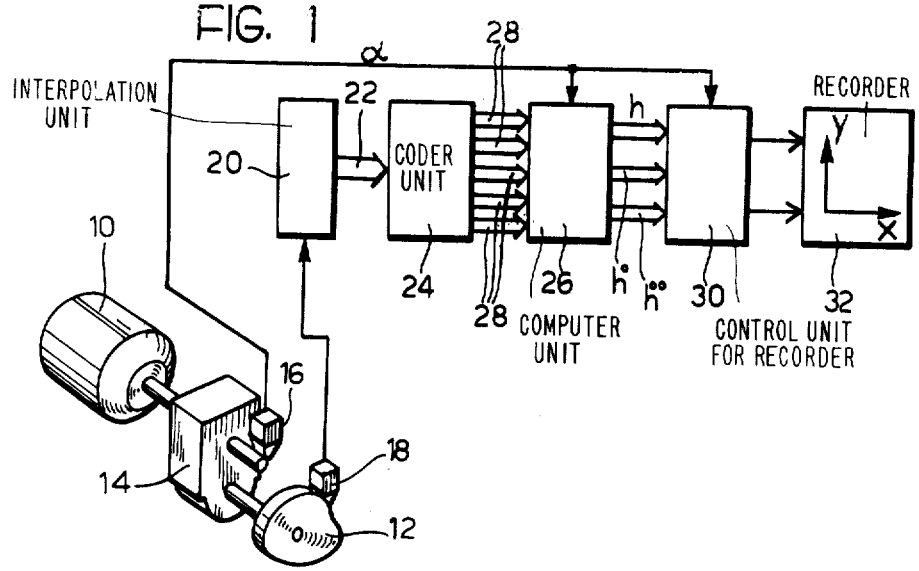
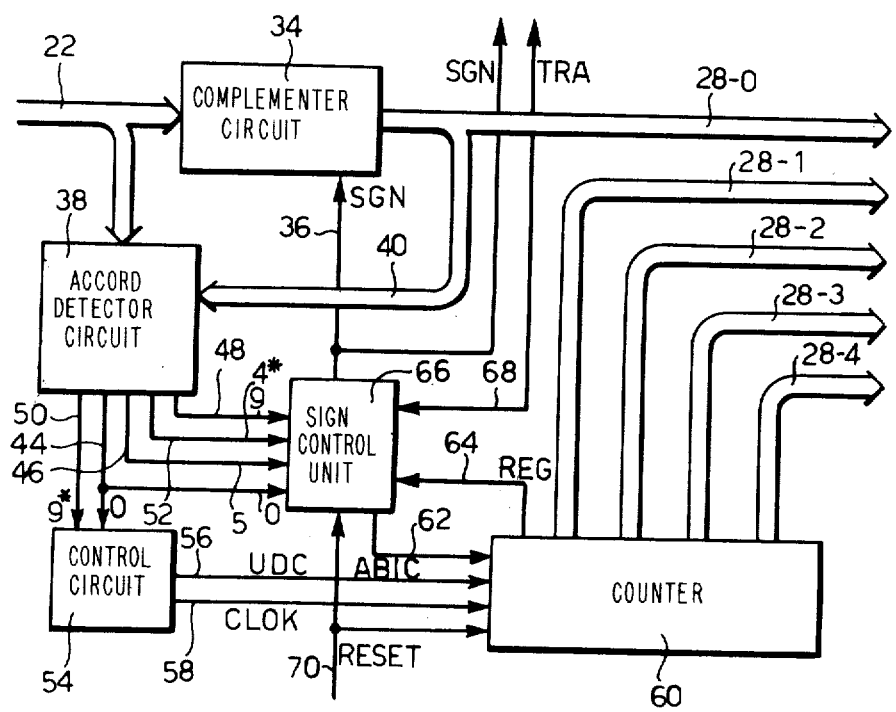

APPARATUS FOR DETERMINING THE COURSE OF STROKE, SPEED, AND ACCELERATION ON A CAM PROFILE

The present invention relates to an apparatus which directly furnishes either graphically or by way of analogous or digital signals the stroke $h$ (alpha) resulting from a given cam profile as a function of the angle of rotation alpha of the cam and the first and second derivatives according to time $h'$ (alpha) and $h''$ (alpha), in other words the speed or velocity and the acceleration. The stroke, speed, and acceleration are significant for members such as rocker arms or levers and/or valves cooperating with the cam.

With internal combustion engines having inlet and outlet valves which are controlled by means of cams one of the conditions to be observed if good functioning at higher speed is to be obtained is the degree by which the practical realization actually approaches the theoretical law of movement of the valve.

The design of a given cam profile is greatly determined by the maximum positive and negative accelerations tolerated in the kinematic chain which links the cam with the valve. And for good functioning it is indispensable that the differences between the actually realized function of movement $h$ (alpha) and the theoretical function of movement H (alpha) are such that there are no intolerable disagreements between the practical and the theoretical accelerations $h''$ (alpha) and $H''$ (alpha).

In practice, above all during the phases of design and construction of a test cam profile the quality of the cam profile produced and thus the result of the control are determined definitively by the confrontation of the law of the theoretical acceleration and the law of the acceleration realized in practice by the cam profile. Vice versa, the mere determination of the curve of the stroke $h$ (alpha) obtained in practice of a given cam and comparison thereof with the theoretical curve of the stroke H (alpha) permits only a checking of the first approximation which does not always give evidence of the real dynamic behavior or of the inertia forces which such a cam will cause during actual operation. Having obtained a given curve of the stroke by experiment it is, of course, possible to trace the acceleration curve resulting from it by readily accessible methods of procedure. Yet the application of such procedures is cumbersome and the result is obtained only slowly.

Although instruments for determining curves of the stroke are commercially available, there are at present no means for directly determining the curves of acceleration and speed.

It is the object of the present invention to provide an apparatus for determining the curves of stroke, speed, and acceleration of a given profile of a plane, rotating cam by means of which the problem of completely automatic control of the finished cam is solved by simple and quick methods and in such a way that, after the experimental determination made on the basis of the cam profile, no further calculations or graphic constructions are required.

To meet the above and further objects which will become apparent from the specification the invention provides an apparatus for determining the curves of stroke, speed, and acceleration on a plane, rotating cam means, comprising in combination:

a. a displacement sensor means cooperating with the cam means for emitting a pulse train, proportional in number to the stroke of the cam means, upon rotation of said cam means, b. a coder means controlled by said pulse train emitted by said displacement sensor means for furnishing a digital signal of the stroke of the cam means, c. a computer means controlled by the digital signal of the stroke for calculating the first and second derivatives of said signal and for furnishing digital signals of the stroke, speed, and acceleration of the cam means which are variable in time, d. an angular movement sensor means cooperating with said cam means for emitting a digital signal of angular displacement of said cam means upon rotation of said cam means, e. an X-Y recorder means with an ordinate recording input and an abscissa recording input capable of being controlled by respective analogous signals, f. a conversion and synchronization circuit means controlled by the signals emitted by said coder means and processing means and by the signal movement sensor means, respectively, for converting said signals into analogous form in accordance with prefixed increments of the signal emitted by said angular movement sensor and for furnishing corresponding analogous signals proportional to said signals for the ordinate input and abscissa input of said X-Y recorder means.

Figure 4:
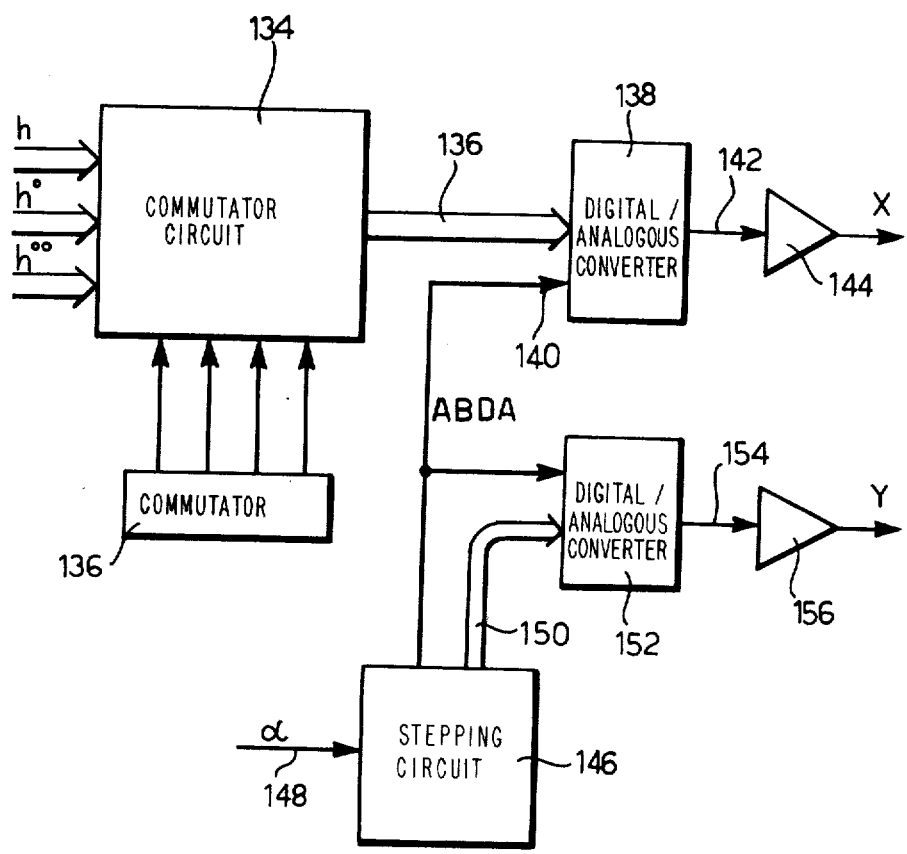

The invention will now be described further, by way of example, with reference to the accompanying diagrammatic drawings, in which:

FIG. 1 is a simplified block diagram of a complete embodiment of the apparatus according to the invention, FIG. 2 is a block diagram of a coder unit forming part of the apparatus shown in FIG. 1, FIG. 3 is a block diagram of a computer unit forming part of the apparatus shown in FIG. 1, FIG. 4 is a block diagram of a control unit of an X-Y recorder forming part of the apparatus shown in FIG. 1.

In FIG. 1 a synchronous motor 10 controls the rotation of a cam 12 by way of a reduction gear 14 having a reduction ratio of 20:1. Preferably the reduction gear 14 is of a type having a prime shaft or drive shaft and double output, such as manufactured by Tecnomeccanica Gribaudo, series U. An angular rotation sensor 16 of known convenient structure, for instance a PT 1000/B sensor by Messrs. Remex is controlled from said gear by the second output of the drive shaft thereof. The output of said sensor furnishes a signal constituted by a sequence of pulses, the number of which is proportional to the angle of rotation of the shaft.

Upon rotation of the cam 12 a path follower or cam displacement sensor 18 detects the stroke of the cam and transmits a digital signal consisting of a sequence of pulses proportional in number to the degree of displacement.

In a preferred embodiment of the invention the cam displacement sensor is of the type 831819 by Messrs. Leitz and its precision is ±0.001 mm. The stroke signal $h$ supplied by the cam displacement sensor 18 is applied to an interpolation unit 20 which receives the signal consisting of a rectangular pulse train, the period of which corresponds to a displacement or stroke of 50 $\mu$m. Said interpolation unit subdivides each period by interpolation into 50 parts and provides the result in the form of eight bits at its output 22. In the BCD code these bits represent the numbers from 50 to 99. The interpolation unit 20 preferably is a unit of the type ISC by Messrs. Leitz. Of the eight bits or two figures furnished at the output 22 only the four bits of the lower index value are used, from which all the necessary information is received.

The signal available at the output 22 of the interpolation unit 20 is applied to a coder unit 24, to be described in greater detail below with reference to FIG. 2. In the form of five decimals the coder unit recovers from the input information the digital representation of the stroke measured in module and sign with respect to an initial arbitrary zero adjustment. The coder unit 24 further pilots an optical numerical indicator of the stroke (not shown in the drawing). A computer unit 26, on the one hand, receives the digital output signal of five decimals in binary coded form from the unit 24 through lines 28 and, on the other hand, an alpha signal of the angular displacement furnished by the angular rotation sensor 16 and calculates the values of the stroke, speed, and acceleration, the latter ones at the end of each angular step in rotation of the cam under investigation. The computer unit 26 will also be described in more detail below with reference to FIG. 3.

The signals $h$, $h'$, and $h''$ furnished by the computer unit 26 are subsequently processed in a control unit 30 which also receives the alpha signal from the angular rotation sensor 16. The control unit 30 converts the signals mentioned above into analogous signals in the desired scales by interpolating linearly between the calculated values for each angular step of the cam. The control unit 30 pilots an X-Y recorder of any known suitable type, for example of the type 7004 B by Messrs. Hewlett Packard. Also the control unit 30 will be described in greater detail below with reference to FIG. 4.

Referring to FIG. 2 the coder unit 24 will now be described. The digital signal of the stroke in the form of four bits supplied through line 22 is applied to a complementer circuit 34 consisting of a combination net which effects the supplementation to 10 of the input bits when an SGN signal is available at an enabling input 36 of the complementary circuit 34.

The digital signal of line 22 is also applied to an accord detector circuit 38 which also receives the output signal of the complementer circuit 34 through a four-bit line 40. The accord detector circuit 38 consists of a combination net which recognizes in the input bits the configurations corresponding to the values 0, 5, 9, 9*, 4* and signalizes the presence of one of those numbers on respective output lines 44, 46, 48, 50, and 52.

A control circuit 54 receives the signals from lines 44 and 50, i.e. the existence of configurations corresponding to 0 and 9*. The control circuit consists of a sequential circuit which emits UDC and CLOCK signals, through lines 56 and 58, in relation to their developing in time. Especially the UDC signal changes state each time the succession in the appearance of the values 9* and 0 is inverted. The CLOCK signal consists of a succession of pulses having the cadence of the input pulse signal of the interpolation unit 20. The UDC and CLOCK signals are applied to corresponding inputs of a counter 60 of UDC type which also receives an ABIC signal (described below) at another input 62. The counter 60 counts the CLOCK pulses in the sense indicated by the UDC signal when the enabling ABIC signal is present and emits the result of the counting through four output lines of four bits each, designated 28-1, 28-2, 28-3, 28-4 and corresponding to the tens, hundreds, thousands, ten thousands of the amount of displacement. The counter 60 also emits a REG signal through a line 64 to indicate the condition of all registers of the counter being adjusted to zero. The counter 60 and a sign or mark control circuit 66 are capable of being adjusted to zero by applying a RESET signal through a line 70. The signals of lines 44, 46, 48, and 52 are also applied to the sign control circuit 66 which further receives the REG signal through line 64 from the counter 60 and produces the SGN signal at the enabling input 36 when it determines that the amount of displacement has passed through zero. The sign control circuit 66 consists of a sequential circuit which generates the SGN signal when the following conditions are fulfilled successively:

a. when the REG signal is given which, as stated above, indicates that all the registers of the counter are at zero adjustment, b. when the amount of displacement has successively assumed the values 5 and 4*, c. when the amount of displacement has assumed the value zero and subsequently the digital representation of that amount has assumed the value 9*.

Furthermore, the sign control circuit 66 generates the ABIC signal only when the displacement amounts to values outside of the range (+5, −5) so as to keep the counter blocked when the amount of displacement is within said range. Finally, the sign control circuit 66 generates an overflow TRA signal, passed on through a line 68, when the counter 60 has reached its maximum capacity.

The amount of displacement coded in the lines 28 is applied not only to optical numerical indicators (not shown in the drawings) but also to the computer unit 26 of FIG. 1 which will now be described with reference to FIG. 3.

In FIG. 3 the five lines designated 28 in FIG. 2 are combined in a single line 28 for the sake of clarity. Line 28 is connected to the input of a buffer memory 72 which may be enabled to receive and memorize the digital signal of line 28 by means of an enabling ABIB signal applicable to an input 74 of said buffer.

The content of buffer 72 is applied to a first input 76 of a digital comparator 78, to the second input 80 of which the content of an up/down counter 82 is applied. The comparator 78 emits a PIU signal through an output line 84 when the value applied to its input 76 is greater than that applied to its input 80 and a MENO signal through an output line 86 when the value applied to its input 76 is smaller than that applied to its input 80. If the two values are identical, the comparator 78 does not produce any signal. A divider circuit 88 receives the pulse train which embodies the alpha signal of the angular rotation sensor 16 of FIG. 1 and which has a period corresponding to a predetermined angle of rotation of the cam 12.

In a preferred embodiment of the invention it corresponds, for example, to an angle of rotation of 4 feet 19 inches of the cam. The divider circuit 88 divides the pulses of the alpha signal by a desired factor selectable by means of a commutator (not shown) and, upon completion of a desired angular step of the cam, furnishes at its output a PASSO signal to be passed on by a line 90. In the preferred embodiment the angular step may be chosen from among three values, namely 0.72°, 1.44°, and 2.88°. A control circuit 92 receives the PASSO signal from the divider circuit 88 and, at an input 94, the SGN signal from the sign control circuit 66 (FIG. 2), and, at an input 96, the bit corresponding to the figure of the lesser index valve of the digital signal of line 28, and through lines 84 and 86, respectively, the PIU and MENO signals from the comparator 78. The control circuit 92 also receives a REGH signal, to be described below, through a line 98 from the up/down counter 82, and also a REGA signal, to be described below, through a line 100. The control circuit 92 emits the ABIB signal when it receives the PASSO signal consisting of a pulse of short duration, e.g. 2 microseconds, so as to permit the memorization of the digital signal from line 28 in the buffer 72. A synchronization circuit forming part of the control circuit 92 then controls the further development of the figure of the lesser index value of the digital signal of the stroke (line 96) causing a repetition of the process (memorization) in case the bit corresponding to said figure of lesser index value changes its value during the existence of the ABIB signal. If a change of the bit in question at the input 96 is determined also during the second process, the synchronization circuit will generate an ERC alarm signal at a line 102 so as to illuminate a warning light on the dashboard (not shown). Simultaneously with the emission of the ABIB signal the control circuit 92 emits a TRASF signal through a line 118 to another up/down counter 114 so as to effect transmission of the content of a speed counter 110 through a line 120 to the up/down counter 114. At the same time or shortly thereafter the control circuit 92 emits a cancellation CANC signal through a line 122 so as to adjust the speed counter 110 to zero.

Furthermore, upon the termination of the PASSO signal the control circuit 92 generates a CLOV signal which consists of a pulse train of predetermined cadence and is transmitted by a line 104, provided at least one of the PIU and MENO signals is present. The CLOV signal is applied to a calculation input 106 of the up/down counter 82 for the displacement, to a calculation input 108 of the speed counter 110, and also to a calculation input 112 of the up/down counter 114 for the acceleration. The CLOV signal ends as soon as both the PIU and the MENO signals disappear simultaneously.

Simultaneously with the emission of the CLOV signal the control circuit 92 emits an "up/down" UDH signal for a control input 116 of the up/down counter 82 for the displacement. The UDH signal assumes a first state so as to have the counter 82 count in the sense of increasing if the PIU signal is given, and has a second state so as to have the counter count in decreasing sense if the MENO signal is given. During emission of the CLOV signal the control circuit 92 also emits a UDA signal for control of the calculation of the up/down counter 114 for the acceleration, this signal is applied through a line 124. It has a first state to cause counting in increasing sense in the counter 114 if the sign or mark of the content of the counter 110 just transmitted is positive, and a second state to cause counting in decreasing sense if the content just mentioned is negative. Finally, the control circuit 92 emits three signals: SH, SV, and SA through respective lines 126, 128, and 130 to indicate the signs of the signals for the stroke $h$, the speed $h'$, and the acceleration $h''$. The respective signals present on line 28, output line 120 of the counter 11o, and an output line 132 of the up/down counter 114 which are signals of five figures, four figures, and three figures, respectively, form the signal for the stroke $h$, the speed $h'$ and the acceleration $h''$, respectively, of the cam outline, and they are made available as such at outputs connected to the input of the control unit 30 of the X-Y recorder 32, as will be described below with reference to FIG. 4.

It is considered superfluous to describe in detail the internal structure of the control circuit 92 for it can be realized in various ways, all to be conceived easily by those skilled in the art since the operational characteristics have been described above.

The operation of the computer unit described in detail with reference to FIG. 3 will now be explained. When the PASSO signal appears and on the assumption that the bit corresponding to the figure of lesser index value on line 96 does not vary, the control circuit 92 emits the ABIB signal. The buffer 72 then memorizes the digital signal of the stroke coming from line 28. The speed counter 110 is adjusted to zero, while the up/down counter 114 for the acceleration is charged with the content of the counter 110. Upon termination of the ABIB signal the content of the buffer 72 is confronted with that of the up/down counter 82 for the displacement. As will be seen, the content of the latter counter is the value of the stroke corresponding to the preceding angular step of the cam. The comparison will begin in the comparator 78. If the new value of displacement in the buffer 72 is greater than that of the preceding angular step, the comparator 78 emits the PIU signal and the counter 82 counts the CLOV pulses in increasing sense until they will end upon disappearance of the PIU signal. This situation is given when the content of the counter 82 is identical with that of the buffer 72 and the counter 82, consequently, has been brought to the new value of the stroke. At the end of the CLOV signal pulse train the counter 110 will also contain the value of the stroke increment between the preceding step and the present one. This value, of course, is proportional to the speed corresponding to the present step. The up/down counter 114 for the acceleration will also have counted the CLOV signal pulses, starting from the value of the speed of the preceding angular step of the cam, in decreasing or increasing sense depending on the fact whether the speed of the preceding step was positive or negative, as established by the UDA signal. At the end of the calculation the counter 114 will thus contain the value of the acceleration at the present angular step. The most recent values of the stroke, speed, and acceleration are thus available at the output lines.

At the beginning of the confrontation during the next angular step the counter 82 will thus be adjusted to the instant step, the counter 110 will be adjusted to zero so as to count again the increment of the stroke, while the counter 114 will be charged with the value of the speed of the instant step in preparation for the counting of the future increment in speed corresponding to the acceleration.

The control unit of the X-Y recorder 32 will now be described with reference to FIG. 4 which shows the unit 30 of FIG. 1 in greater detail.

The signals of stroke, speed, and acceleration $h$, $h'$ and $h''$, respectively, on lines 28, 120, and 132 are applied to a commutator circuit 134 controlled by commutators, designated in general 136, which are capable of being governed from the dashboard. Upon command from the commutators 136 the commutator circuit 134 selects from the three input signals that signal which is to be presented on an X-Y recorder. Still upon command by the commutators it also selects for each signal the scale of the desired sensitivity, taking into consideration the fact that the precision obtainable during the subsequent conversion into an analogous signal and in the X-Y recorder is about 0.1%. Thus only three of the figures of the input signal are useful. As the stroke signal $h$ comprises five figures (down to micrometer), it is thus possible to choose among three scales of sensitivity corresponding to the use of the three figures of the lesser index value (maximum sensitivity), the three intermediate figures (medium sensitivity) or the three figures of the higher index value (minimum sensitivity). However, only two sensitivity scales are available for the speed signal $h'$ since this signal comprises four figures. Finally, for the acceleration signal $h''$ a single sensitivity scale is available. It is obvious that when selecting another sensitivity that the minimum one, the curve traced by the X-Y recorder 32 passes to zero whenever one or more of the figures of higher index value not used changes or change.

The preselected signal in the desired sensitivity of the commutator circuit 134 is applied through a three-figure or 12-bit line 136' to a digital/analogous ordinate converter 138. Upon enabling command applied to an input 140 said converter furnishes the corresponding analogous signal to a line 142 for piloting an operation amplifier 144 which controls the ordinate displacement of the recording pen (not shown). A stepping circuit 146 receives at its input 148 the pulses of the alpha angle signal from the angular rotation sensor 16 and counts and memorizes them. In correspondence with each of these steps it will then pass on the content of the memory through an input line 150 of a digital/analogous abscissa converter 152 and, at the same time, emit an enabling ABDA signal either to converter 138 or to converter 152. In the presence of the enabling signal also the converter 152 converts the input signal into analogous form to be passed on through an output line 154 so as to pilot an abscissa operation amplifier 156 which controls the abscissa displacement of the recording pen (not shown) of the X-Y recorder 32.

The invention may be embodied in other forms without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What we claim is:

1. An apparatus for determining the course of stroke, speed, and acceleration on a profile of a plane, rotating cam means, comprising in combination:
    a. a displacement sensor means cooperating with the cam means for emitting a pulse train, proportional in number to the stroke of the cam means, upon rotation of said cam means,
    b. a coder means controlled by said pulse train emitted by said displacement sensor means for furnishing a digital signal of the stroke of the cam means,
    c. a computer means controlled by the digital signal of the stroke for calculating the first and second derivative of said signal and for furnishing digital signals of the stroke, speed, and acceleration of the cam means which are variable in time.
    d. an angular movement sensor means cooperating with said cam means for emitting a digital signal of angular displacement of said cam means upon rotation of said cam means,
    e. an X-Y recorder means with an ordinate recording input and an abscissa recording input capable of being controlled by respective analogous signals, and
    f. a conversion and synchronization circuit means controlled by the signals emitted by said coder means and computer means and by the angular movement sensor means, respectively, for converting said signals into analogous form in accordance with prefixed increments of the signal emitted by said angular movement sensor and for furnishing corresponding analogous signals proportional to said signals for the ordinate input and abscissa input of said X-Y recorder means; said conversion and synchronization circuit means comprising a digital/analogous converter of the signal of stroke, speed, and acceleration, respectively, of said cam means, a digital/analogous converter of the signal of the angular displacement of said cam means, and a stepping circuit comprising divider and coder means of the pulse signal emitted by the angular movement sensor for furnishing the digital signal of angular displacement and also an enabling signal for the two digital/analogous converters in correspondence with the preselected increment steps of the angular displacement of said cam means.

2. An apparatus for determining the course of stroke, speed, and acceleration on a profile of a plane, rotating cam means, comprising in combination:
    a. a displacement sensor means cooperating with the cam means for emitting a pulse train, proportional in number to the stroke of the cam means, upon rotation of said cam means,
    b. a coder means controlled by said pulse train emitted by said displacement sensor means for furnishing a digital signal of the stroke of the cam means,
    c. a computer means controlled by the digital signal of the stroke for calculating the first and second derivative of said signal and for furnishing digital signals of the stroke, speed, and acceleration of the cam means which are variable in time,
    d. an angular movement sensor means cooperating with said cam means for emitting a digital signal of angular displacement of said cam means upon rotation of said cam means,
    e. an X-Y recorder means with an ordinate recording input and an abscissa recording input capable of being controlled by respective analogous signals, and
    f. a conversion and synchronization circuit means controlled by the signals emitted by said coder means and computer means and by the angular movement sensor means, respectively, for converting said signals into analogous form in accordance with prefixed increments of the signal emitted by said angular movement sensor and for furnishing corresponding analogous signals proportional to said signals for the ordinate input and abscissa input of said X-Y recorder means; said coder means comprising an interpolation unit serving to convert the pulse signal emitted by the angular movement sensor into a single digital figure representing the increments of the stroke, an up/down counter controlled by a "clov" signal at the cadence of the pulses of the displacement sensor means, a complementer means of the figure representing increments of the stroke and control circuits controlled by the figure of the increment of the stroke and by the complemented figure of the increment of the stroke, for generating a UDC control signal in the sense of calculating for a counter means, and at the same time, in the sense of further developing said single figure of the stroke, the content of the counter means constituting the digital signal of the stroke.

3. An apparatus according to claim 2, wherein said coder means further comprises a circuit for the determination of the sign controlled by the figure of increment of the stroke, the complement of the figure of increment of the stroke, and a signal furnished by the counter means when its content is zero, for furnishing a signal indicating said sign.

4. An apparatus for determining the course of stroke, speed, and acceleration on a profile of a plane, rotating cam means, comprising in combination:
  a. a displacement sensor means cooperating with the cam means for emitting a pulse train, proportional in number to the stroke of the cam means, upon rotation of said cam means,
  b. a coder means controlled by said pulse train emitted by said displacement sensor means for furnishing a digital signal of the stroke of the cam means,
  c. a computer means controlled by the digital signal of the stroke for calculating the first and second derivative of said signal and for furnishing digital signals of the stroke, speed, and acceleration of the cam means which are variable in time,
  d. an angular movement sensor means cooperating with said cam means for emitting a digital signal of angular displacement of said cam means upon rotation of said cam means,
  e. an X-Y recorder means with an ordinate recording input and an abscissa recording input capable of being controlled by respective analogous signals, and
  f. a conversion and synchronization circuit means controlled by the signals emitted by said coder means and computer means and by the angular movement sensor means, respectively, for converting said signals into analogous form in accordance with prefixed increments of the signal emitted by said angular movement sensor and for furnishing corresponding analogous signals proportional to said signals for the ordinate input and abscissa input of said X-Y recorder means; said computer means comprising:
  a. a transit memory to be enabled so as to be adjusted to the instant digital value of the signal of the stroke,
  b. an up/down counter for the stroke serving to count the pulses of an applied clov signal in the sense determined by a UDH control signal of the counting sense,
  c. a digital comparator serving to confront the respective contents of said transit memory and of said up/down counter for the stroke and to furnish a PIU signal on a first line or a MENO signal on a second line, depending on the fact whether the content of said transit memory is greater or smaller than the content of the stroke counter,
  d. a speed counter serving to count the pulses of said clov signal and capable of being adjusted to zero by an applied cancellation signal,
  e. an up/down counter for the acceleration which serves to count the pulses of said clov signal in the sense determined by a UDA control signal of the counting sense and which is connected to the output of the speed counter so as to be adjusted to the instant content of said counter upon application of a transmission signal,
  f. a divider circuit controlled by the pulse train emitted by said angular movement sensor for emitting a step signal upon completion of rotations of said cam means of preselected angular distance, and
  g. a control circuit for said computer means started by said step signal so as to emit an enabling signal for said transit memory, the cancellation signal for said speed counter, the transmission signal for said acceleration counter, and the clov pulses, and to further emit said UDH signal to cause said stroke counter to count in increasing sense if said PIU signal is present and in decreasing sense if said MENO signal is present, and to emit said UDA signal to cause said acceleration counter to count in increasing sense if the preceding content of said speed counter was negative and in decreasing sense if said content was positive.

* * * * *